US006183837B1

(12) United States Patent
Kim

(10) Patent No.: US 6,183,837 B1
(45) Date of Patent: Feb. 6, 2001

(54) SOUNDPROOF ALUMINUM HONEYCOMB-FOAM PANEL

(76) Inventor: Tae Bong Kim, 105-910 Shinbanpo 2 Giku, 73, Jamwon-dong (KR)

( * ) Notice: Under 35 U.S.C. 154(b), the term of this patent shall be extended for 0 days.

(21) Appl. No.: 09/233,736

(22) Filed: Jan. 20, 1999

(30) Foreign Application Priority Data

Jun. 2, 1998 (KR) ............................................. 98-20350

(51) Int. Cl.[7] .............................................. B32B 3/12

(52) U.S. Cl. ......................... 428/118; 181/292; 428/593

(58) Field of Search .................................. 428/116, 118, 428/593; 181/292

(56) References Cited

U.S. PATENT DOCUMENTS 3,868,297 * 2/1975 Jamison et al. ..................... 428/116
3,994,105 * 11/1976 Jamison et al. ...................... 52/127
4,557,961 * 12/1985 Gorges ............................... 428/117
5,927,129 7/1999 Thoms et al. ........................ 72/268

* cited by examiner

*Primary Examiner*—Francis J. Lorin
(74) *Attorney, Agent, or Firm*—Snell & Wilmer

(57) ABSTRACT

There is disclosed a panel for use in soundproofing walls, having a base organization in which an aluminum foam board containing numerous open pores and a noise-insulating metal board are attached to either side of an aluminum honeycomb structure via adhesive sheets. The numerous open pores allow the aluminum foam board to absorb medium to high-frequency sound waves while many hexagonal cells in the aluminum honeycomb structure serve as air pockets in which resonance occurs to attenuate low-frequency noise of 500 Hz or less. Thus, with the ability of the noise-insulating metal board to prevent the propagation of sound waves, the panel can effectively absorb and block noise over a wide frequency range. The panel has the advantages of being semi-permanent in life span, highly resistant to corrosion and excellent in surface strength enough to be resistant to impact, generating neither hazardous articles nor dust, and being reusable.

3 Claims, 3 Drawing Sheets

SOUNDPROOF ALUMINUM HONEYCOMB-FOAM PANEL

BACKGROUND OF THE INVENTION

The present invention relates, in general, to a soundproof panel, and in particular, to a panel for use in soundproofing walls, having a multilayer organization in which an aluminum honeycomb structure is applied with a sound-absorbing board and a noise insulator at each side of the structure.

Originating from machinery, traffic vehicles, such as cars, trains, airplanes and the like, construction sites, audio instruments, etc., unfavorable sound, that is, noise, is a daily event. It is well known that noise is an injurious factor to personal health by causing hardness of hearing, headaches, uneasiness, etc. In addition, in industrial fields, noise and vibrations from machinery and instruments make a poor environment for workers, giving rise to a serious decrease in productivity and product quality.

Thus, it is strongly demanded that such a noise source be designed to operate as quietly as possible and that measures be taken to prevent the noise, once occurring, from propagating outside its own environment.

Now, this soundproofing is needed for almost all life environments, including working places, roadsides, railway sides, airports, construction sites, common living spaces, such as apartments and offices, performance places, such as concert halls, and theaters, gymnasiums and various resort complexes.

Conventionally, soundproof structures made from sound-controlling material or soundproof materials capable of absorbing or insulating sound, such as noise barriers, soundproof partitions and soundproof rooms, are provided for the noise sources, in order to absorb noise and block its propagation.

General construction materials, such as wood and concrete, synthetic resins, such as polyurethane, polyethylene and polyester, inorganic fiber materials, such as glass wool and rock wool, metal materials, such as perforated metal plate, alone or in combination, are most widely used as soundproofing or sound-insulating materials.

Soundproofing or sound-insulating materials are required to show high sound absorption or insulation power over a wide frequency range and superiority in mechanical properties, such as durability, and thermal properties, such as incombustibility, as well as to be low in production cost with ease in carrying out construction therewith.

The aluminum fences which are now widely used as soundproofing walls for roadsides, have a front side which is usually processed in a gallery shape or a void structure. Because these aluminum fences are of low perforation, they reflect but do not absorb sounds effectively. In result, they are poor in soundproofing performance. Furthermore, the aluminum fences in current use are weak and do not endure for a long time, so that they are easily crushed, broken or otherwise damaged.

Such a conventional aluminum fence is usually provided with a sound-absorbing member, such as glass wool or rock wool, with the aim of enhancing its soundproofing performance. For a time immediately after being installed within the aluminum fence, the sound-absorbing member is maintained at its regular position, enabling the aluminum fence to absorb noise. With the lapse of time, the sound-absorbing member falls due to its own weight or the external conditions including rain, moisture and wind, which diminishes the sound-absorption ability of the soundproofing aluminum wall as well as abridges the life span thereof.

To the rear side of the conventional aluminum fence, a plated steel board would be attached to function as a noise insulator as well as a structural material. After a long period, the plated steel board is eroded, deleteriously affecting the appearance of the aluminum fence and decreasing the structural strength thereof.

The conventional aluminum fence is too heavy and weak as a soundproof panel. Thus, before an aluminum fence is constructed, H-beam props are usually arranged at a close distance (e.g. a distance of 2,000 mm) to support the aluminum fence, so that a large quantity of secondary materials are required. In addition, the foundation for the aluminum fence should be firm. For these reasons, the conventional aluminum fence is disadvantageous in construction cost.

On the other hand, soundproofing wood walls are high in construction and material cost. In addition, they are difficult to maintain or repair and have a problem of being short in life span. Soundproofing synthetic resin walls are vulnerable to flame and easily altered into other shapes, so that they are short in life span.

Glass wool or rock wool, which is used to increase sound-absorption ability, is poor in durability. What is worse, it produces pollution of the environment. Perforated metal plates themselves have not sound-absorption ability, so that they should be used in combination with other sound-absorbing members, such as glass wool. Moreover, almost all conventional soundproof materials except metal materials, are poor in appearance and incapable of being recycled, so they produce wastes upon being discarded.

SUMMARY OF THE INVENTION

Therefore, it is an object of the present invention to overcome the above problems encountered in prior arts and to provide a light panel for use in soundproofing walls, which is high in strength and superior in soundproofing ability with a complex structure in which an aluminum honeycomb and an aluminum foam are combined.

It is another object of the present invention to provide an aluminum honeycomb-foam panel for use in soundproofing walls, which can be manufactured into a large-size, thereby relieving the need for excessive secondary materials.

It is a further object of the present invention to provide a semi-permanent aluminum honeycomb-foam panel, which gives facility to the construction of soundproofing walls and to maintenance and post-management.

In accordance with the present invention, the above objects could be accomplished by a provision of an aluminum honeycomb-foam panel for use in soundproofing walls, comprising an aluminum honeycomb structure comprising a plurality of hexagonal aluminum cells; a sound-absorbing aluminum foam board with a plurality of open pores, which is attached to one side of the aluminum honeycomb structure via an adhesive sheet; a noise-insulating metal board, selected from a steel board, a zinc-plated steel board, an aluminum board, or a stainless steel board, which is attached to the other side of the aluminum honeycomb structure via an adhesive sheet.

The aluminum honeycomb-foam panel in accordance with the present invention is a lamination construction having excellent soundproofing ability, in which a honeycomb structure formed of aluminum thin plates is underlaid by a noise insulator and overlaid by a sound-absorbing, aluminum foam board. That is, many hexagonal cells in the aluminum honeycomb structure serve as air pockets in which resonance occurs to attenuate low-frequency noise of 500 Hz or less while the open pores in the aluminum foam board absorb medium to high-frequency noise. Meanwhile, the noise insulator in the aluminum honeycomb-foam panel acts to prevent the propagation of sound waves.

In addition, the central position of the aluminum honeycomb structure in the aluminum honeycomb-foam panel of the present invention gives a great contribution to improving the strength of the panel. That is, the presence of numerous hexagonal aluminum cells between the sound-absorbing aluminum foam board and the noise insulator in the aluminum honeycomb-foam panel, result in the fact that more numerous I-shaped aluminum beams support the board and the noise insulator, giving rise to an increase in structural strength.

Because the panel of the present invention is, for the most part, made of aluminum, which is a light metal, and the air pockets and the open pores amount, in volume, to at least 97% and 90% of the honeycomb structure and the sound-absorbing aluminum foam board, respectively, the soundproofing walls made of the panels of the invention weigh little.

Accordingly, the aluminum honeycomb-foam panel for use in soundproofing walls shows excellency in sound absorption and noise insulation with high strength and low weight. Thus, the panel of the present invention can be manufactured into a large sized product which makes it easy to construct a soundproofing wall at roadsides with savings of construction cost. For instance, while H-beam props are arranged at the distance of about 2 m in order to support the load of conventional panels when constructing a soundproofing wall at the roadside, the panels according to the present invention make it possible to construct a soundproofing wall without standing props within the distance of up to 6 m.

The aluminum honeycomb-foam aluminum panel for use in soundproofing walls, in accordance with the present invention has the advantages of being semi-permanent in life span, highly resistant to corrosion and excellent in surface strength enough to be resistant to impact, generating neither hazardous articles nor dust, and being reusable.

Further, the aluminum honeycomb-foam panel for use in soundproofing walls, in accordance with the present invention is easy to bend and cut, so that it can be manufactured into a desired shape, such as a rectangle, triangle, circle, oval or U figure.

BRIEF DESCRIPTION OF THE DRAWINGS

The above and other objects and aspects of the invention will become apparent from the following description of embodiments with reference to the accompanying drawings in which.

DESCRIPTION OF THE PREFERRED EMBODIMENT

Figure 1:
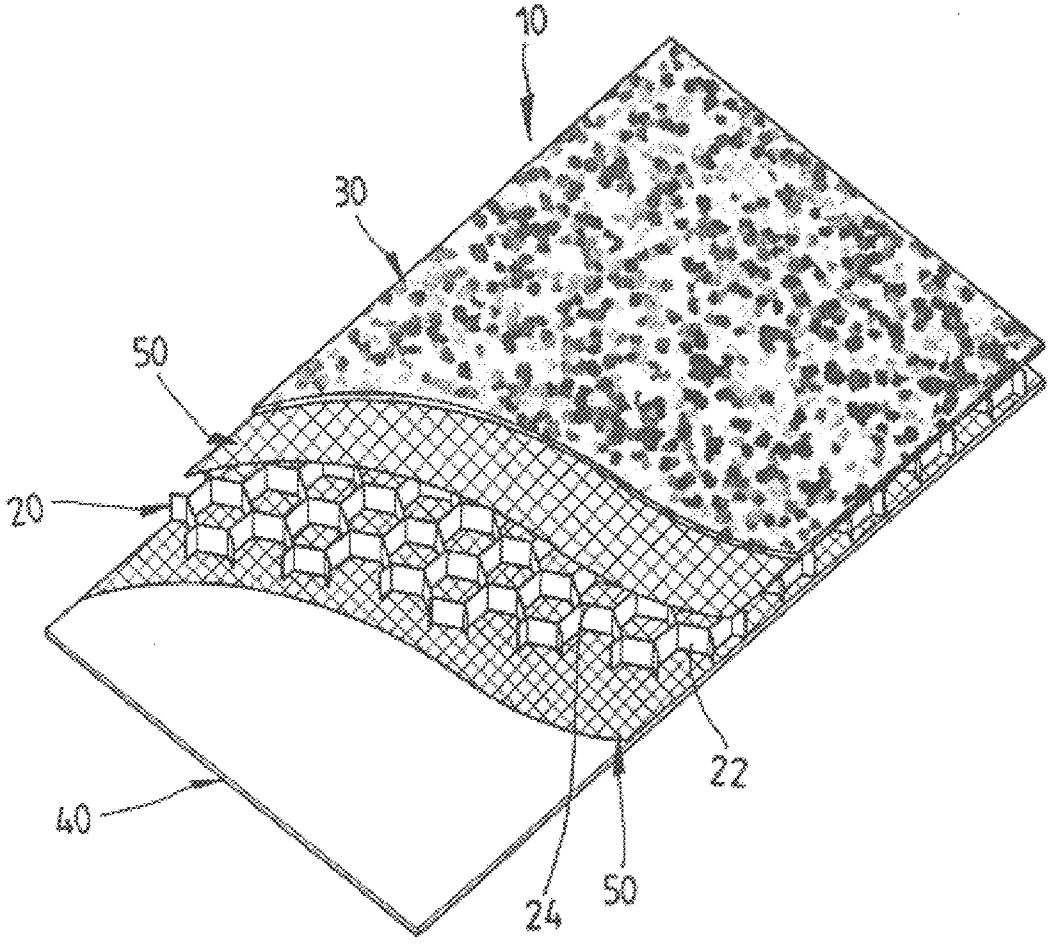
FIG. 1 is a partially broken perspective view showing an aluminum honeycomb-foam panel for use in soundproofing walls, in accordance with an embodiment of the present invention.

The application of the preferred embodiments of the present invention, which are set forth to illustrate but are not to be construed to limit the present invention, is best understood with reference to the accompanying drawings, wherein like reference numerals are used for like and corresponding parts, respectively.

First, with reference to FIG. 1, there is an aluminum honeycomb-foam panel 10 for use in soundproofing walls, according to an embodiment of the present invention. As shown in this figure, the aluminum honeycomb-foam panel 10 has a laminated organization comprising an aluminum honeycomb structure 20 to either side of which a sound-absorbing aluminum foam board 30 and a noise insulator 40 are each attached via an adhesive sheet 50.

Comprising numerous hexagonal cells 24, the mid-positioned, aluminum honeycomb structure 20 may be prepared by truncating, cutting and expanding an aluminum honeycomb core which is a block mass of laminated aluminum thin sheets 22. In accordance with a preferred exemplary embodiment, aluminum honeycomb structure 20 consists of hexagonal cells 24 arranged in a substantially regular pattern, as shown in the figures.

The preparation of the aluminum honeycomb 20 from the honeycomb core is achieved by following known processes. Initially, An aluminum honeycomb core which is a lamination of aluminum thin sheets 22 is truncated into an appropriate size fragment with the aid of a cutter. At this time, care must be taken to keep the truncated edges of the fragment flat and not to generate deformation owing to heat or truncating force or scars owing to the cutting blade. Particularly, careful attention must be paid lest the core might be entangled by heat.

Thereafter, the honeycomb core fragment is precisely cut into the size of the final product, followed by expanding the cut fragment. In this regard, uniform application of force is required to form regular hexagonal cells and not to defectively expand the hexagons.

Depending on where to use the panel 10 and on the soundproofing performance that the panel 10 requires, the dimensions of the honeycomb cells employed in the panel 10 are determined. A non-limiting, explanatory example is that each of the hexagonal cells 24 is 10–200 mm thick with a diagonal dimension ranging from about 6 to 50 mm.

The sound-absorbing aluminum foam board 30 which is attached to one side of the aluminum honeycomb structure 20, contains numerous open pores 32 which are formed by subjecting a mass of aluminum to a conventional foaming process and by then rolling it into a board. For instance, a mass of aluminum is molten in a mold equipped with a heater and a stirrer. After being maintained at an appreciate viscosity with the aid of a viscosity increasing agent, the molten aluminum is added with a foaming agent to produce an aluminum foam with closed pores. When rolling the aluminum foam, its closed pores break into open ones.

The term open pores as used herein, means the air bubbles which are trapped in not a closed state, but an open state in aluminum foam. Upon foaming aluminum metals, air bubbles form therein, most of which are closed, each providing a closed space. Because the aluminum panels containing such closed pores are now found to fall short of the ability to absorb sound waves, there are needed novel soundproof aluminum panels which are better in absorption of sound and/or insulation of noise. In the invention, the closed pores in aluminum foams are burst into open states by lightly rolling the aluminum foam panels.

The rolling with the aim of opening the closed pores may be carried out by pressing the aluminum foams in the lengthwise direction of the aluminum, to the extent that the thickness of the aluminum foams is reduced by, for example, about 20–30%. Of course, the rolling reduction is determined depending on the conditions of the resulting aluminum, such as use, thickness, etc. Care should be taken not to compress the pores to flat by increasing the rolling reduction. The aluminum foam panels thus obtained can be light sound-absorbing materials with a pore volume amounting up to 90% in total.

The place where the panel 10 is used and the soundproofing performance which the panel 10 requires, are also important factors which determine the dimension of the sound-absorbing aluminum board 30.

To the other side of the honeycomb structure 20, opposite to the side of the aluminum board 30, the noise insulator 40 is attached. Non-limiting examples of the noise insulator include a steel board, a zinc-plated steel board, an aluminum board and a stainless steel board with a thickness of 0.3–2 mm. In addition to functioning to prevent the propagation of sound, the noise insulator preferably serves as a construction finish material. In order to provide richness for the role as a finish material, the exposed surface of the noise insulator 40 is coated with paint, fluorine resin, enamel, etc. These coats have a further effect of preventing corrosion on the noise insulator 40.

As aforementioned, the panel 10 for use in soundproofing walls in accordance with the present invention is obtained by bonding the soundabsorbing aluminum foam board 30 and the noise insulator 40 on either sides of the aluminum honeycomb structure 20, respectively, via adhesives.

Preliminary for the bonding, a cleaning step is taken to remove impurities from the sound-absorbing aluminum foam board. For instance, the aluminum foam board is immersed in water in a waterbath and ultrasonicated to remove impurities therefrom, so as to enhance the adhesiveness of the board. The cleaned, wet aluminum foam board 30 is preferably desiccated by a heater, such as a drying furnace, rather than being let stand to air dry.

There is no limitation to the adhesive if it is able to bond the members to each other sufficiently. Because the honeycomb structure 20 may not provide a sufficient bonding area, it is preferable to use a sheet 50 coated with a thermosetting adhesive, such as an epoxy type adhesive, so as to increase the adhesiveness between the honeycomb structure and other members.

After the aluminum foam board 30 and the noise insulator 40 are respectively applied through the adhesive sheet 50 to either side of the aluminum honeycomb structure 20, the adhesive is more preferably cured at a temperature of 120–250 C for about 2 hours while pressurizing with a press 60 for a complete bonding. Upon pressurizing, the force is uniformly distributed over the whole surface area of the resulting lamination. Attention should be paid lest too strong force is applied, so as to not crush the honeycomb structure or the foam structure.

When the panels with the above-described structure are used for soundproofing walls, medium to high frequency sounds are absorbed in the aluminum foam board 30 by virtue of the open pores 22 (closed pores cannot show a sufficient sound absorption effect) and sound in a low frequency of 500 Hz or less, is attenuated by the resonance effect of the air pockets while the propagation of noise is blocked by the noise insulator 40, the soundproofing walls can effectively absorb and block noise over a wide frequency range.

The aluminum honeycomb-foam panel 10 of FIG. 1 is a standard structure for the present invention. This standard structure, if necessary, may be supplemented with additional aluminum honeycomb structure, sound-absorbing aluminum foam board and/or noise insulator, so as to reinforce the sound absorption performance and strength.

Figure 2:
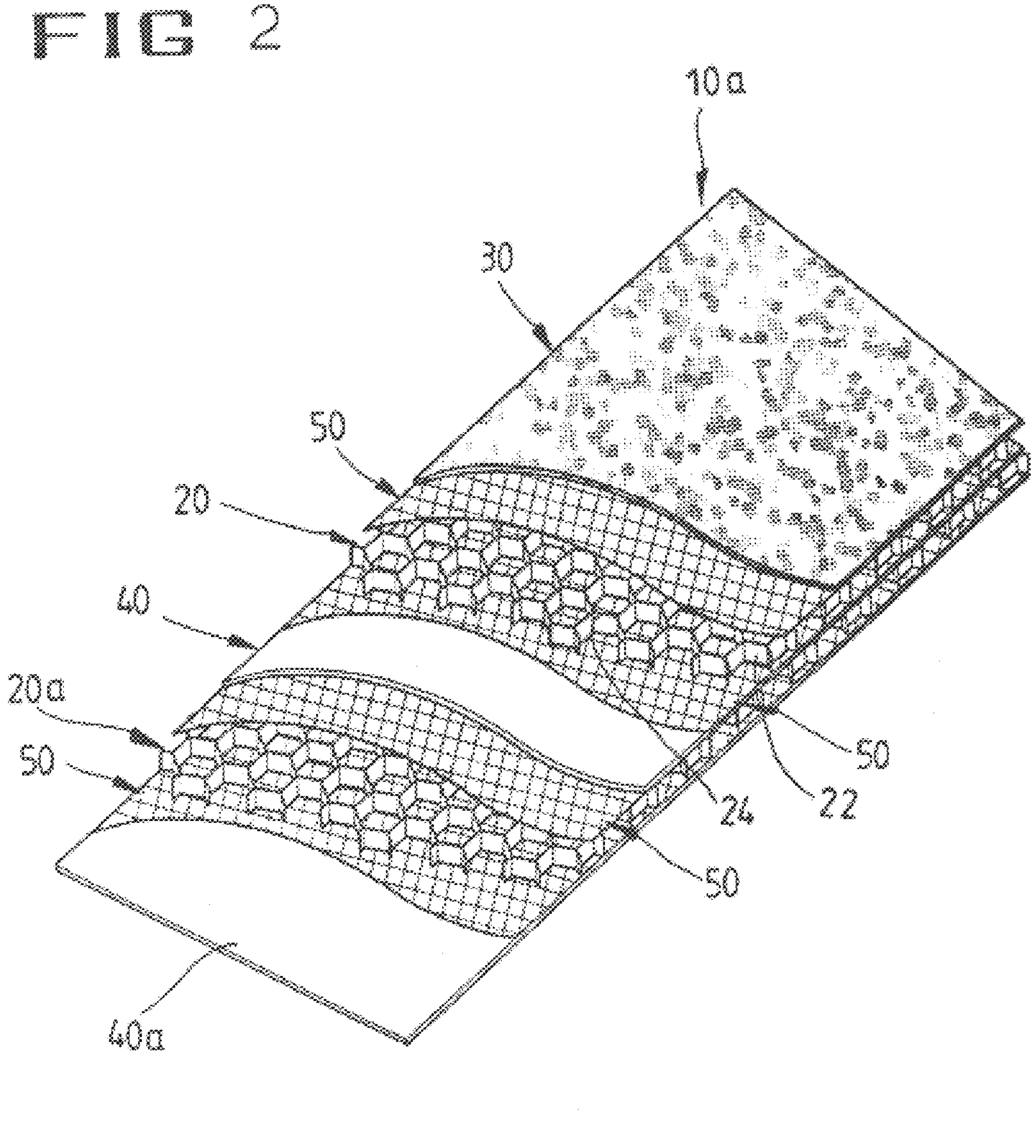
FIG. 2 is a partially broken perspective view showing an aluminum honeycomb-foam panel in accordance with another embodiment of the present invention.

With reference to FIG. 2, there is another panel structure supplemented with additional members, according to another embodiment of the present invention. As shown in this figure, a panel 10*a* for use in soundproofing walls comprises the standard structure of FIG. 1 to the noise insulator side of which an aluminum honeycomb structure 20*a* and a noise insulator 40*a* are subsequently attached via adhesives 50. Herein, the noise insulator 40 is a steel board while the noise insulator 40*a* is a fluorine-coated steel board. The panel 10*a* having such a structure is greatly improved in strength and sound-absorption and insulation.

Figure 3:
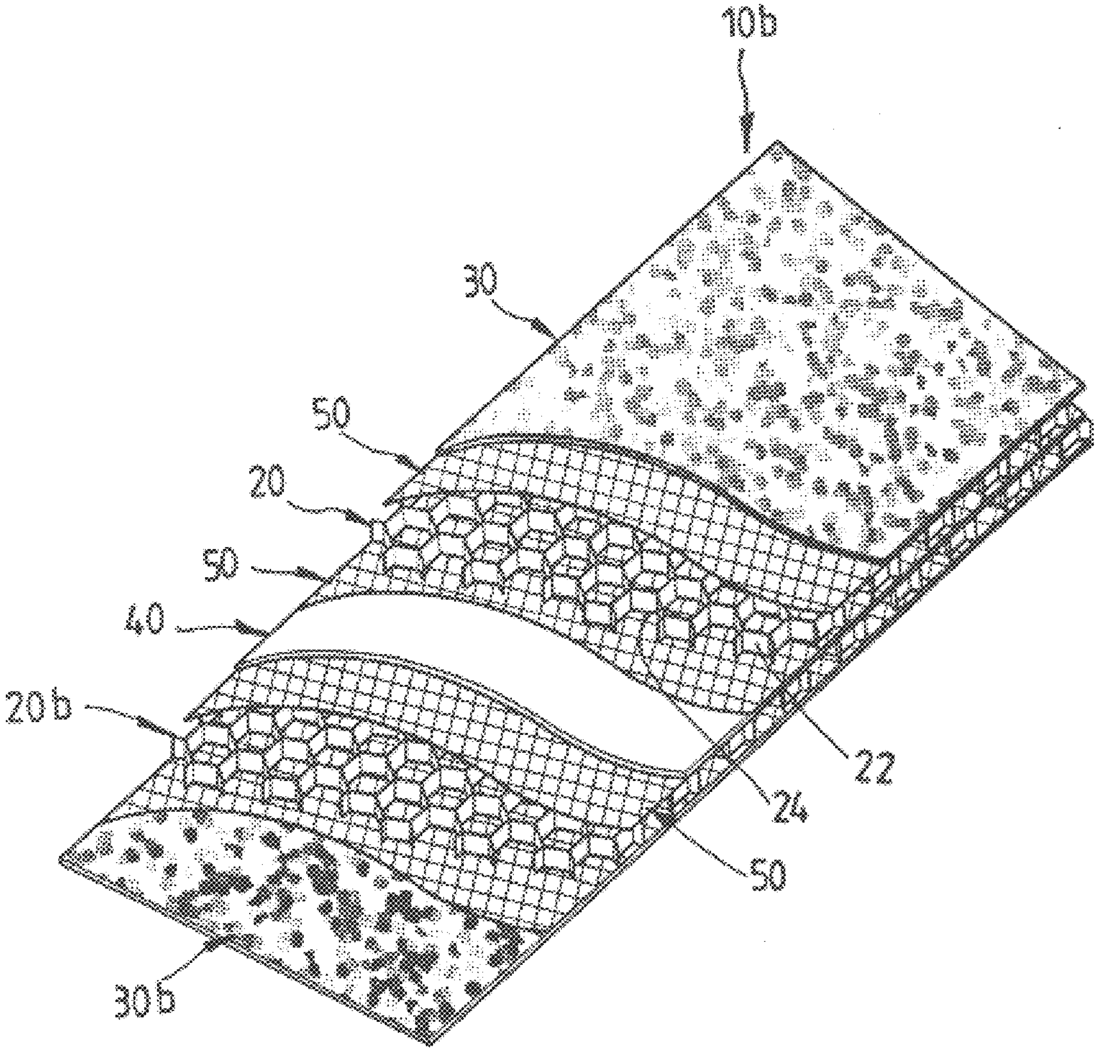
FIG. 3 is a partially broken perspective view showing an aluminum honeycomb-foam panel in accordance with a further embodiment of the present invention.

With reference to FIG. 3, there is a double structure of the panel 10 of FIG. 1, according to another embodiment of the present invention. As shown in FIG. 3, a panel 10*b* comprises the standard panel structure of FIG. 1 to the noise insulator side of which an aluminum honeycomb structure 20*b* and a sound-absorbing aluminum foam board 30*b* are subsequently attached via adhesives 50. This panel 10*b* according to this embodiment can be applied for a soundproofing wall at the place where sound must be precisely controlled, such as at auditoria.

The aluminum honeycomb-foam panels according to the present invention can be used for soundproofing walls in all places and facilities that require sound absorption or noise insulation, such as roadsides, railway sides, express railways, subways, airports, buildings, cars, ships, factories, sound-related edifices, gymnasiums, etc. Particularly, if soundproofing walls are constructed with the panels of the present invention at open places, such as roadsides or railway sides, the open pore-containing aluminum foam aboard may be utilized as a support for the growth of vines, such as ivy vines, which may contribute to the landscape.

As described hereinbefore, the aluminum honeycomb-foam panels for soundproof walls in accordance with the present invention show a superior ability to absorb sound and to insulate noise over a wide frequency range, particularly, a range of 500 Hz or less. In addition, because the panels each weigh little, but have high strength, they can be manufactured into large sized ones which make it easy to construct a soundproofing wall with a great saving of construction cost. Further, the panels have the advantages of producing no pollution of the environment, e.g. causing dust, and being reusable. Furthermore, the panels are incombustible, so that they generate no toxic gas in the event of a fire.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An aluminum honeycomb-foam panel for use in soundproofing walls, comprising an aluminum honeycomb structure having a plurality of hexagonal aluminum cells; a sound-absorbing aluminum foam board with a plurality of open pores, which is attached to one side of the aluminum honeycomb structure via an adhesive sheet; and a noise-insulating metal board, which is attached to the other side of the aluminum honeycomb structure via an adhesive sheet, said noise-insulating metal board being selected from the group consisting of a steel board, a zinc-plated steel board, an aluminum board, or a stainless steel board.

2. An aluminum honeycomb-foam panel as set forth in claim 1, further comprising another additional aluminum honeycomb structure and another additional noise-insulating metal board, which are subsequently attached to the side of the preexisting noise-insulating metal board via adhesive sheets.

3. An aluminum honeycomb-foam panel as set forth in claim 1, further comprising another additional aluminum honeycomb structure and another additional sound-absorbing aluminum foam board, which are subsequently attached to the side of the preexisting noise-insulating metal board via adhesive sheets.

* * * * *